(12) United States Patent  
Kiyohara et al.

(10) Patent No.: US 10,243,901 B1  
(45) Date of Patent: Mar. 26, 2019

(54) HANDLING CONTEXT DATA FOR TAGGED MESSAGES

(71) Applicant: GOOGLE LLC, Mountain View, CA (US)

(72) Inventors: Keith Shoji Kiyohara, Santa Monica, CA (US); Henry Benjamin, Sherman Oaks, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/040,983

(22) Filed: Feb. 10, 2016

Related U.S. Application Data

(63) Continuation of application No. 13/593,413, filed on Aug. 23, 2012, now Pat. No. 9,286,144.

(51) Int. Cl.
*G06F 15/16* (2006.01)
*H04L 12/58* (2006.01)

(52) U.S. Cl.
CPC .................... *H04L 51/08* (2013.01)

(58) Field of Classification Search
CPC ...................................... G06F 9/546
USPC ....................................... 709/206
See application file for complete search history.

(56) References Cited

U.S. PATENT DOCUMENTS

| 2002/0032622 | A1* | 3/2002 | Petit ............... G06Q 10/087 705/26.35 |
| 2002/0122543 | A1* | 9/2002 | Rowen ................. 379/93.01 |
| 2004/0078595 | A1* | 4/2004 | Kent, Jr. ........... G06Q 10/107 713/160 |
| 2005/0020246 | A1* | 1/2005 | Kang ................ H04W 4/14 455/412.1 |
| 2005/0114759 | A1* | 5/2005 | Williams ........... G06Q 10/10 715/221 |
| 2008/0109406 | A1* | 5/2008 | Krishnasamy et al. ......... 707/3 |
| 2010/0064007 | A1  | 3/2010 | Randall |
| 2010/0082751 | A1* | 4/2010 | Meijer et al. ............. 709/206 |
| 2010/0179988 | A1* | 7/2010 | Nomura ................ H04L 51/38 709/203 |
| 2010/0211868 | A1  | 8/2010 | Karmarkar et al. |
| 2010/0312769 | A1  | 12/2010 | Bailey et al. |
| 2011/0004483 | A1  | 1/2011 | Ting et al. |
| 2011/0252066 | A1  | 10/2011 | Alterman |
| 2012/0036197 | A1* | 2/2012 | Bishop .............. G06Q 10/107 709/206 |
| 2012/0078869 | A1* | 3/2012 | Bellville .......... G06F 17/30943 707/706 |
| 2012/0221656 | A1* | 8/2012 | Cai et al. .................... 709/206 |
| 2012/0254184 | A1* | 10/2012 | Choudhary et al. ......... 707/738 |
| 2012/0331399 | A1* | 12/2012 | Eidelson ........... H04M 1/72552 715/753 |
| 2013/0198299 | A1* | 8/2013 | Chhaochharia ....... G06Q 30/02 709/206 |

(Continued)

*Primary Examiner* — Hamza N Algibhah
(74) *Attorney, Agent, or Firm* — Lowenstein Sandler LLP (57) ABSTRACT

The subject disclosure relates to a machine-implemented method handling context data for tagged messages. The method includes identifying a tagged message, wherein the tagged message is generated by a user and includes content, obtaining context data associated with the tagged message, wherein the context data is obtained based on at least one of user input for the tagged message or server data for the tagged message, and providing access to the tagged message according to the obtained context data.

20 Claims, 5 Drawing Sheets

(56) References Cited

U.S. PATENT DOCUMENTS

| | | | |
|---|---|---|---|
| 2013/0219333 A1* | 8/2013 | Palwe | H04M 1/72522 715/810 |
| 2013/0282835 A1* | 10/2013 | Bates | H04L 51/32 709/206 |
| 2013/0288722 A1* | 10/2013 | Ramanujam et al. | 455/466 |
| 2013/0347004 A1* | 12/2013 | Day | G06F 9/546 719/313 |
| 2014/0006163 A1* | 1/2014 | Sengupta et al. | 705/14.58 |
| 2014/0304622 A1 | 10/2014 | Jorasch et al. | |
| 2014/0365570 A1 | 12/2014 | Peters | |

\* cited by examiner

HANDLING CONTEXT DATA FOR TAGGED MESSAGES

CROSS-REFERENCE TO RELATED APPLICATIONS

This application is a continuation of U.S. patent application Ser. No. 13/593,413, entitled "Handling Context Data For Tagged Messages," filed on Aug. 23, 2012, which is hereby incorporated by reference in its entirety for all purposes.

BACKGROUND

Hashtags may be used to mark messages with a searchable string, which can be useful for categorizing messages that may be related to one another. Hashtags may work well for messages that have a wide audience, such as messages intended to be viewed by the general public. These messages, for example, may be messages for a particular celebrity, a particular movie, or any other public entity. For example, "#starwars" may be a tagged message that may link to content that is related to the Star Wars movie. However, hashtags may not be as useful for messages that are intended to be shared with a smaller audience.

SUMMARY

The present disclosure relates generally to processing metadata, and, in particular to a machine-implemented method that includes identifying a tagged message, wherein the tagged message is generated by a user and includes content, obtaining context data associated with the tagged message, wherein the context data is generated based on at least one of user input for the tagged message or server data for the tagged message, and providing access to the tagged message according to the obtained context data.

These and other aspects may include one or more of the following features. Providing access to the tagged message according to the obtained context data may include disseminating the tagged message according to the obtained context data. Providing access to the tagged message according to the obtained context data may also include filtering search results for the tagged message according to the obtained context data. The context data may include an access control list, an identity of the user, a location of where the tagged message is generated, a time when the tagged message is generated, and a program used to generate the tagged message.

Obtaining context data associated with the tagged message may include providing an option for the user to input context data for the tagged message. Obtaining context data associated with the tagged message may also include obtaining context data based on user input. Still further, obtaining context data associated with the tagged message may include obtaining context data based on server data for the tagged message.

Processing context data for tagged messages may also include identifying a second tagged message, wherein the second tagged message includes second content and is associated with second context data, comparing the context data associated with the tagged message with the context data associated with the second tagged message and grouping the first content and the second content based on the comparison of the context data associated with the tagged message with the context data associated with the second tagged message.

The subject disclosure also relates to a machine-readable medium with instructions stored therein, which when executed by the processors, cause the processors to perform operations that include identifying a first tagged message, wherein the first tagged message is generated by a first user and includes first content and obtaining context data associated with the first tagged message. The instructions also include identifying a second tagged message, wherein the second tagged message is generated by a second user and includes second content, obtaining context data associated with the second tagged message, comparing the context data associated with the first tagged message with the context data associated with the second tagged message, and grouping the first content and the second content based on the comparison of the context data associated with the first tagged message with the context data associated with the second tagged message.

These and other aspects may include one or more of the following features. Obtaining context data may include generating the context data. Generating context data associated with the first tagged message may include providing an option for the first user to input context data for the first tagged message and providing an option for the second user to input context data for the second tagged message. Generating context data associated with the first tagged message may include generating context data based on user input for the first tagged message and generating context data based on user input for the second tagged message. Generating context data associated with the first tagged message may also include generating context data based on server data for the first tagged message and generating context data based on server data for the second tagged message.

Server data may be determined by a server and may include an access control list, an identity of a user, a location of where the tagged message is generated, a time when the tagged message is generated, or a program used to generate the tagged message. Obtaining context data may include receiving context data from a client device.

The disclosure also provides for a system that includes a tag module configured to identify a first tagged message, wherein the first tagged message is generated by a first user and is associated with first content, and a context module configured to obtain context data associated with the first tagged message, the context data comprising at least one of a first access control list, an identity of the first user, a location of where the first tagged message is generated, a time when the first tagged message is generated, or a program used to generate the first tagged message.

These and other aspects may provide one or more of the following advantages. A message tagged with a hashtag may be shared with a limited group of people, and context data of the tagged message may determine how the tagged message and its content may be shared or grouped.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

In the following detailed description, numerous specific details are set forth to provide a full understanding of the present disclosure. It will be apparent, however, that the implementations of the present disclosure may be practiced without some of these specific details. In other instances, structures and techniques have not been shown in detail so as not to obscure the disclosure.

According to various aspects of the subject technology, systems and methods are provided for processing context data (e.g., metadata) for tagged messages. The context data may be used to provide access to a tagged message and its content to a particular audience. The message may be tagged with, for example, a hashtag or another searchable string. A tagged message that is generated during an online chat session that includes a list of participants, may include context data that limits the distribution of the content to the list of participants involved in the online chat session.

Context data may comprise an access control list that controls the dissemination of content. The access control list may be defined by a user applying the hashtag. For example, when a user uploads a digital photograph to a social network, the user may select a list of social network contacts to grant them permission to view the photograph. The list may form part of the context data that is associated with the photograph. Likewise, the context data may include the identity of the user. Based on the user's social network settings and preferences, an access control list may also be generated for the content such as a photograph at a server. Additional context data may be added to context data associated with a tagged message by a server hosting the social network, as well as on the device where the tagged message is created, for example.

The context data may likewise provide information about the location of where the tagged message was generated, who authored the tagged message, a time when the tagged message was generated, a program used to generate the tagged message, and any other information which may be used to restrict content associated with the tagged message to a particular audience. In some aspects, context data associated with a tagged message from one user may be compared with context data associated with a tagged message from another user. Such a comparison may allow the content associated with each of the two tagged messages to be grouped and shared with the same audience.

Figure 1:
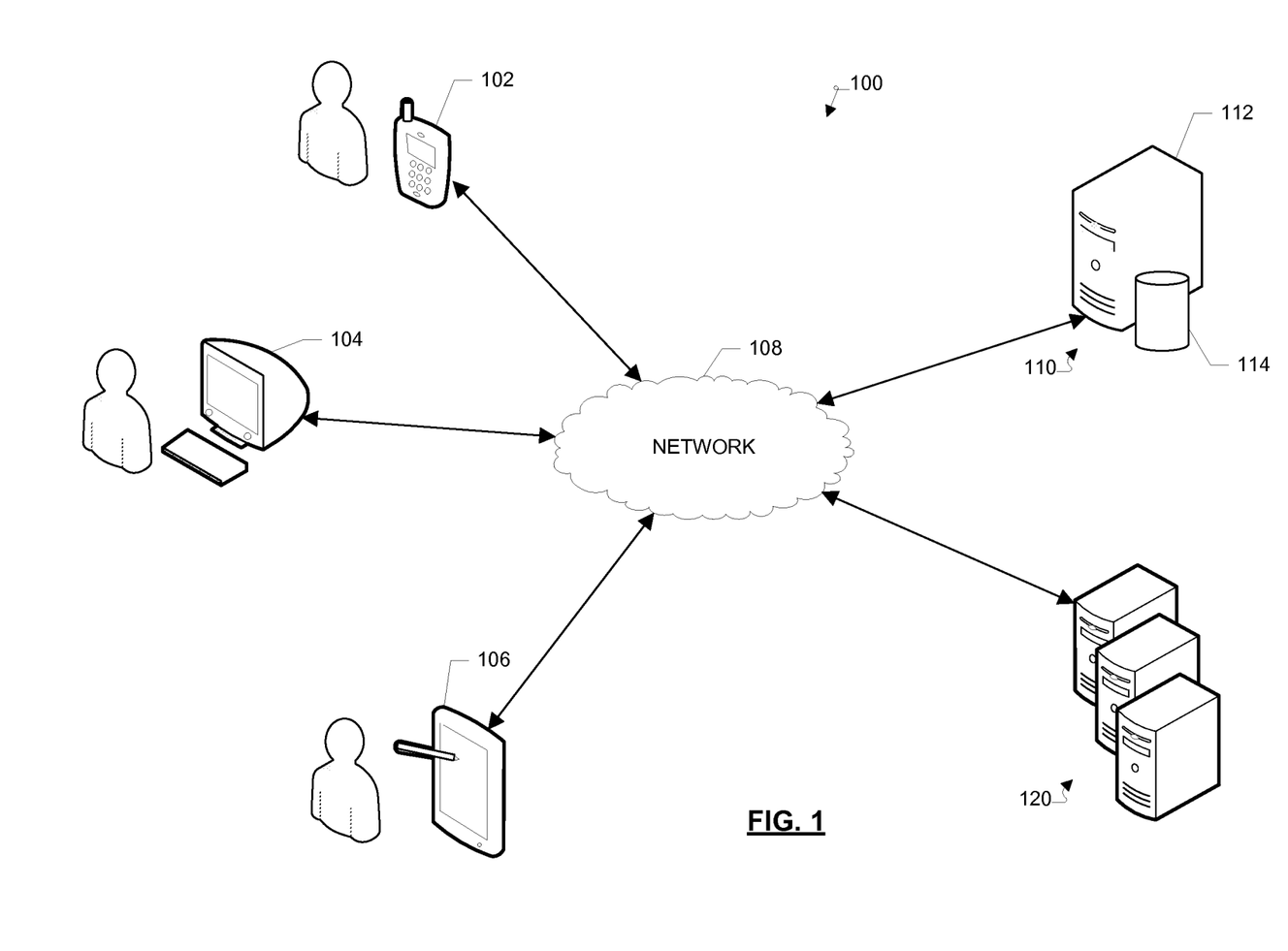
FIG. 1 is a diagram of an exemplary system for processing context data for tagged messages.

FIG. 1 illustrates an example client-server network environment which provides for processing context data for tagged messages. A network environment 100 includes a number of electronic devices 102, 104 and 106 communicably connected to a server 110 by a network 108. Server 110 includes a processing device 112 and a data store 114. Processing device 112 executes computer instructions stored in data store 114, for example, to generate, read, group or otherwise process context data. Data store 114 may store information pertaining to a user's social network preferences and settings, as well as serve as a repository for content, for example.

Processing device 112 may further process context data and determine how content should be distributed. For example, processing device 112 may obtain context data and determine that a series of photographs share similar context data and should be grouped together. For example, a series of photographs uploaded from the same event may be grouped together when the context data suggests that they were taken at the same location, during a short time interval by users who are associated with each other at a social network.

Servers 110 or application servers 120 may host a social network site within which some of the processes discussed herein are implemented. In some example aspects, electronic devices or client devices, as used interchangeably herein, 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application.

Electronic devices 102-106 can be computing devices such as laptop or desktop computers, smartphones, PDAs, portable media players, tablet computers, televisions with one or more processors embedded therein and/or attached thereto, and/or other appropriate computing devices that can be used for social networking (e.g., for allowing user to assess items in a social networking site). In the example of FIG. 1, electronic device 102 is depicted as a smartphone, electronic device 104 is depicted as a desktop computer, and electronic device 106 is depicted as a PDA. A client in an application or a system that accesses a service made available by a server which is often (but not always) located on another computer system accessible by a network. Some client applications may be hosted on a website, whereby a browser is a client. Such implementations are within the scope of the subject disclosure, and any reference to client may incorporate a browser and reference to server may incorporate a website.

The system (e.g., hosted at server 110), detects a tagged message and its content being uploaded to a social network by a client device (e.g., electronic devices 102, 104 or 106). Upon detecting the uploaded tagged message, its content and, in some instances, context data, additional context data may be obtained for the tagged message. The additional context data may be obtained from the server to which the tagged message is uploaded. The context data is then analyzed and the content is distributed, grouped, or otherwise processed.

Application servers 120 may host various applications responsible for searching, publishing and distributing content for a social network. In some example aspects, server 110 can be a single computing device such as a computer server. In other implementations, server 110 can represent more than one computing device working together to perform the actions of a server computer (e.g., cloud computing). The server 110 may host the web server communicationally coupled to the browser at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
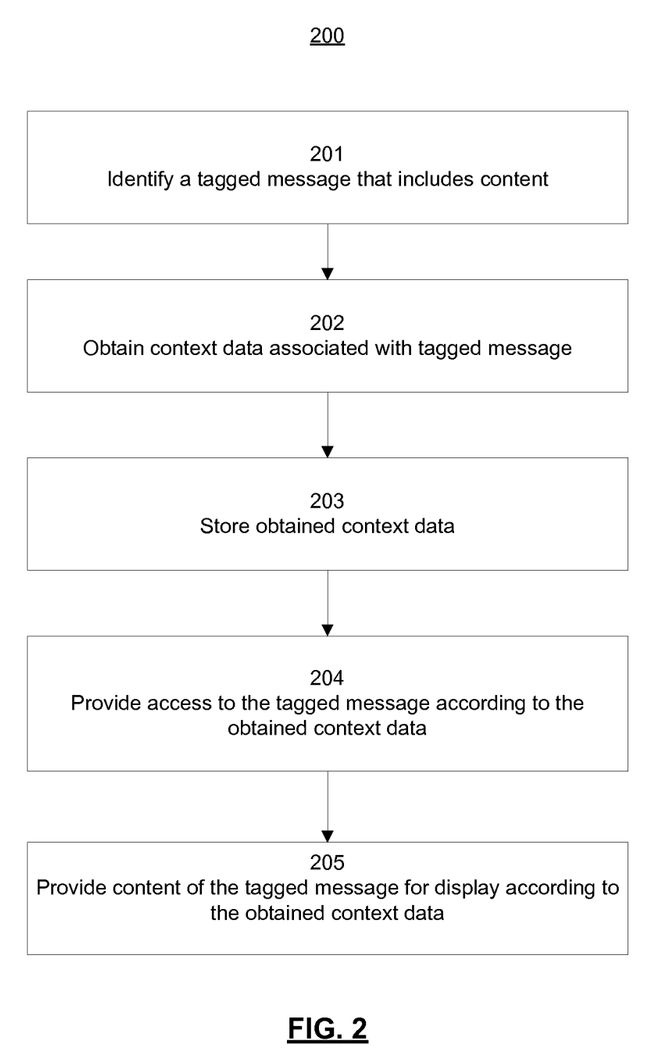
FIG. 2 illustrates a flow diagram of an example process for processing context data for a tagged message.

FIG. 2 illustrates a flow diagram of an example process for processing context data for tagged messages. At block 201, a tagged message identified. A message may be tagged with, for example, a searchable string such as a hashtag. The tagged message is generated by a user and includes content. Content may include, but is not limited to, social network posts, digital media such as photographs and videos, and other digital content that may be created on or transmitted from an electronic device and shared via a network 108.

At block 202, context data associated with the tagged message is obtained. The context data may be obtained from a client device, based on user input for the tagged message or from a server, based on server data for the tagged message. Obtaining context data may also include generating the context data at the server, based on the server data or at a client device, by providing an option to a user to enter context data. Context data may also be automatically generated based on past related content, as previously specified by the user. For example, when several messages are received within a predetermined period of time from the same location, it may be inferred that another message received during the predetermined period of time from that same location should have the same context data.

The context data may be used by the system to restrict sharing of content associated with a tagged message to a particular audience. For example, when a user creates a digital photograph, the user may be presented with an option to add a tag, such as a hashtag, to the photograph. The user may tag the picture with the hashtag "#Johns_wedding." The user may then be presented with an option to share that photograph with the user's social network contacts. The user, by selecting social network contacts with whom the user wishes to share the photograph, creates an access control list ("ACL"), according to which, distribution of the photograph tagged with "#Johns_wedding" may be limited according to the ACL. Thus, context data may comprise an access control list that specifies the particular audience that is allowed to view the content. In some examples, the ACL for the photograph may also be generated at a server hosting the social network website, based on the user's social network settings and preferences.

Other context data may include the identity of the user, the location where the tagged message was generated, who authored the tagged message, a time when the tagged message was generated, a program used to generate the tagged message, and any other information that can be used to restrict content associated with the tagged message to the particular audience. For example, another type of a tagged message may be a social network post including the hashtag "#good_food." For this type of tagged message, in addition to obtaining user identification context data, geo-location context data may be obtained for the tagged message, so that other users may receive or find the post based on the location information. The geo-location data may be obtained from a device where the post was composed. When the post is uploaded to the social network, a time stamp may be added as additional context data for the post. The time stamp is context data that may be obtained from a server and may be called server data. Other server data may include but is not limited to, data determined by a server and may include an access control list, an identity of a user, a location of where the tagged message is generated, or a program used to generate the tagged message. Thus, context data may be obtained from the device used to create or tag a message that includes content, the server responsible for storing or distributing the tagged message and its content to the intended audience, or a combination of both, client and server.

At block 203, the context data is stored in the system. The context data may be stored at a server, for example, and utilized for searching at a later time.

At block 204, the system provides access to the tagged message according to the context data. That is, the message may be filtered and distributed at a social network according to the obtained context data. Specifically, for example, content of a tagged message may be distributed according to an ACL. Content of a tagged message that may be disclosed or omitted in a search result, based on the obtained context data. Still further, content from one or more tagged messages may be grouped together according to the obtained context data, when, after comparing the respective context data, it is determined that the content should be grouped together.

According to an aspect of the disclosed technology, photographs taken at the same event held in the same location during a time period of, for example, three to four hours, may be grouped together based on a comparison of the respective context data. Search functionality may also be implemented on the client device, the server, or both. Searches may be filtered by one or more pieces of context data. It may be interesting for a user to find out if anyone of the user's social network contacts has ever posted a tagged message from the location in which the user is performing the search. Tagged messages such as "#good_food" or #dont_go_here" would be useful to a user performing a search from a restaurant. The process ends at 205, when content associated with the tagged message is provided for display according to the context data.

Figure 3:
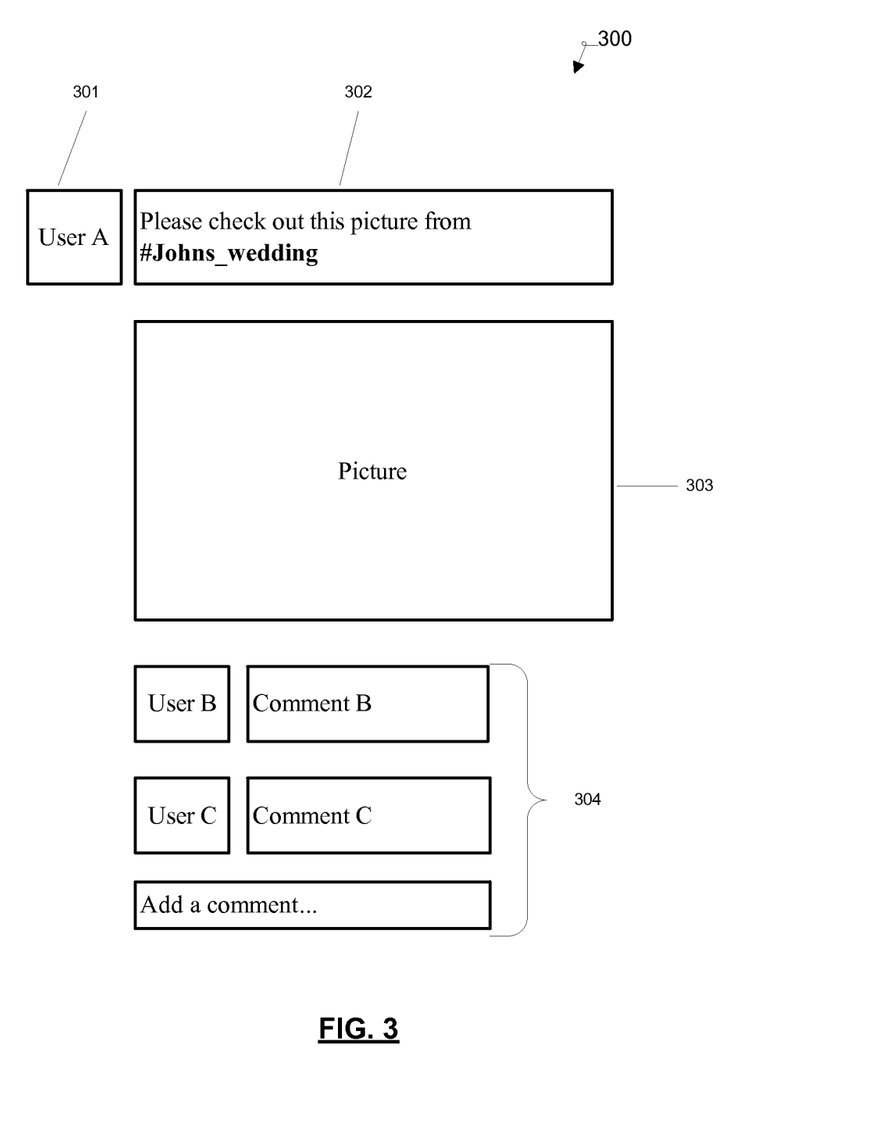
FIG. 3 conceptually illustrates a diagram of a tagged message according to an aspect of the subject technology.

FIG. 3 conceptually illustrates a diagram of a tagged message 300 according to an aspect of the subject technology. Field 301 represents the user ID for User A. As discussed previously, user ID may form part of context data that is generated for the tagged message 300. Field 302 represents a tag field, in which User A may tag the message 300 with a hashtag and a description. Field 303 contains the content that is associated with the tagged message 300. Content may be a photograph, as illustrated herein, or other forms or types of content, such a videos, text, links, etc. Field 304 collectively represents the comments that may be made by User A's social network contacts for the tagged message 300.

As illustrated in FIG. 3, the tag field includes the comment "Please check out this picture from "#Johns_wedding." The hashtag "#Johns_wedding" is associated with content 303. The system obtains context data for the message 300 based in part on the information provided by User A or the client device from which the content is shared. For example, an access control list, an identity of the user, a location of where the tagged message is generated may be obtained from the client. Additional context data such as a time when the tagged message 300 is generated, and a program used to generate the tagged message 300 may be obtained from a server to which the tagged message 300 including the content 303 are uploaded.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
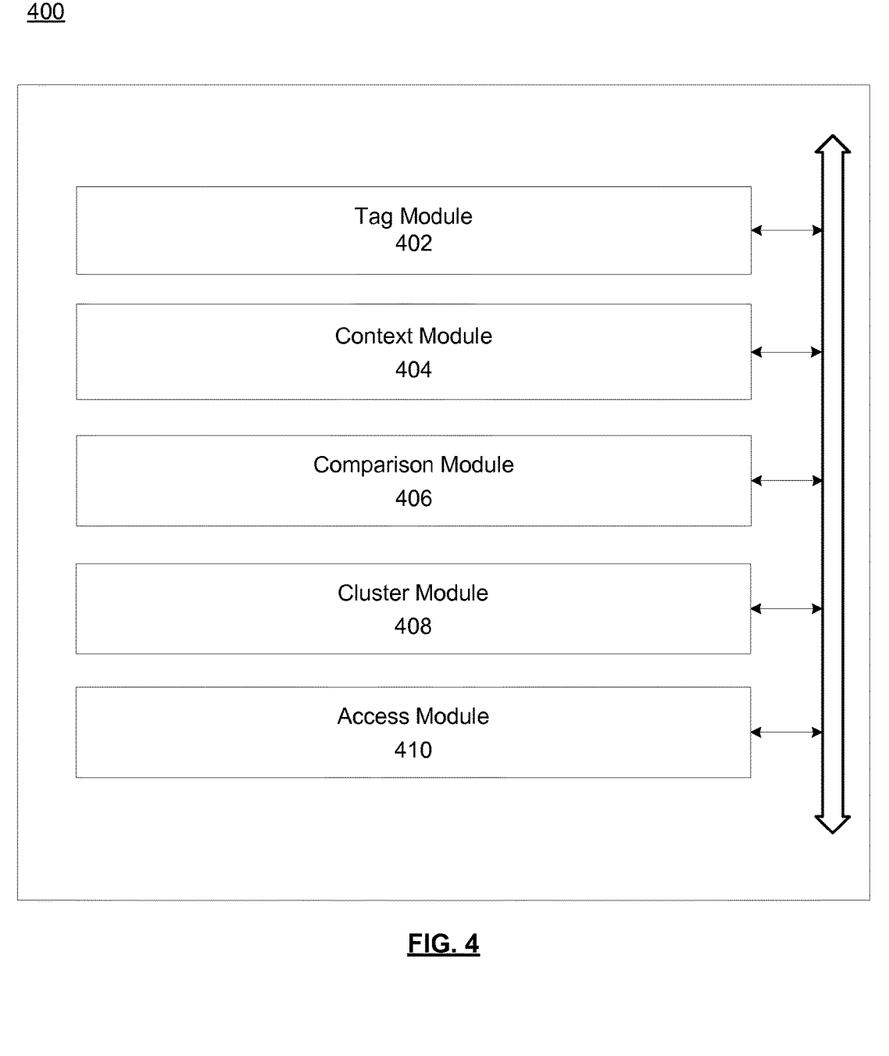
FIG. 4 conceptually illustrates an example of system for processing context data for tagged messages.

FIG. 4 illustrates an example of system 400 for handling context data for tagged messages, in accordance with various aspects of the subject technology. System 400 comprises a Tag module 402, a Context module 404, a Comparison module 406, a Cluster module 408, and an Access module 410.

The tag module 402 configured to identify a first tagged message that is generated by a first user and is associated with first content. The context module 404 is configured to generate context data associated with the first tagged message. The context data includes at least one of a first access control list, an identity of the first user, a location of where the first tagged message is generated, a time when the first tagged message is generated, or a program used to generate the first tagged message. The comparison module 406 is configured to compare the context data associated with the first tagged message with the context data associated with the second tagged message. The cluster module 408 is configured to group the first content and the second content based on the comparison of the context data associated with the first tagged message with the context data associated with the second tagged message. The access module 410 is configured to restrict access to the grouped first and second content based on context data.

These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 5:
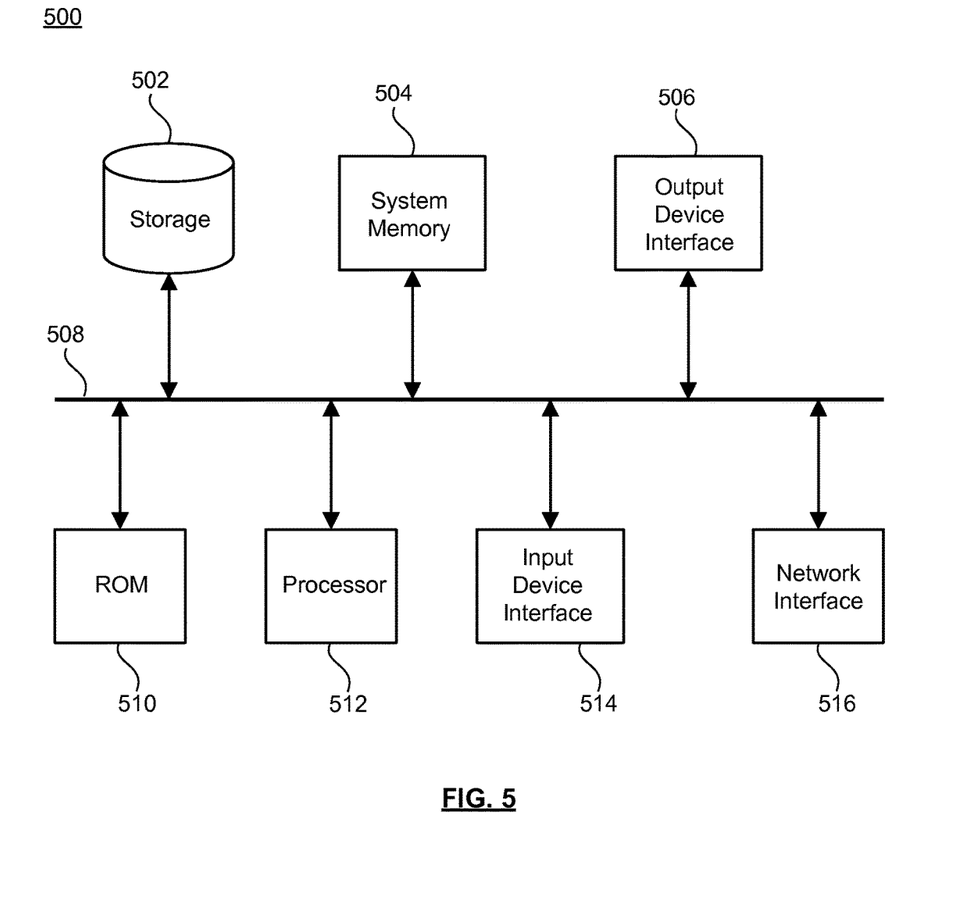
FIG. 5 conceptually illustrates an electronic system with which some aspects of the subject technology are implemented.

FIG. 5 conceptually illustrates an electronic system with which some aspects of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD).

Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method comprising:
   identifying a first tagged message, wherein the first tagged message is provided by a user at a geographic location and comprises content;
   obtaining context data associated with the first tagged message, wherein the context data is based on at least one of user input for the first tagged message or server data for the first tagged message;
   identifying a second tagged message, wherein the first tagged message and the second tagged message are provided at the geographic location and within a predetermined amount of time;
   associating the obtained context data with the second tagged message based on being provided at the geographic location and within the predetermined amount of time; and
   controlling distribution of the first tagged message and the second tagged message to a first set of users determined from the obtained context data.

2. The computer-implemented method of claim 1, wherein controlling distribution of the first tagged message and the second tagged message comprises limiting distribution of the first tagged message and the second tagged message to the first set of users determined from the obtained context data.

3. The computer-implemented method of claim 1, wherein the context data comprises at least one of an access control list, an identity of the user that provided the first tagged message, a location of where the first tagged message is provided, a time when the first tagged message is provided, and a program used to provide the first tagged message.

4. The computer-implemented method of claim 1, wherein obtaining context data associated with the first tagged message includes providing an option for the user that provided the first tagged message to input context data for the first tagged message.

5. The computer-implemented method of claim 4, wherein obtaining context data associated with the first tagged message includes obtaining context data based on user input provided by the user that provided the first tagged message.

6. The computer-implemented method of claim 1, wherein obtaining context data associated with the first tagged message includes obtaining context data based on server data for the first tagged message, the server data having been provided when the first tagged message was provided by the user.

7. The computer-implemented method of claim 1, further comprising:
   identifying an additional tagged message, wherein the additional tagged message includes additional content and is associated with additional context data;
   determining, based at least in part on the additional context data, a second set of users who are authorized to view the additional content of the additional tagged message;
   comparing the first set of users determined from the context data associated with the first tagged message with the second set of users determined from the additional context data associated with the additional tagged message; and
   grouping the content and the additional content when the first set of users determined from the context data associated with the first tagged message coincides with the second set of users determined from the additional context data associated with the additional tagged message.

8. A computer program product comprising instructions stored in a non-transitory computer-readable storage medium, the instructions causing a processing device to:
   identify a first tagged message and a second tagged message, wherein the first tagged message and the second tagged message are provided at a geographic location;
   obtain context data associated with the first tagged message, wherein the first context data is based on at least one of user input for the corresponding first tagged message or server data for the corresponding first tagged message;
   associating the obtained context data with the second tagged message based on the first tagged message and the second tagged message being provided at the geographic location and within a predetermined amount of time;
   provide access to the first tagged message and the second tagged message to one or more users, the one or more users being determined from the obtained context data.

9. The computer program product of claim 8, wherein to provide access to the first and second tagged messages comprises the processing device to disseminate the first and second tagged messages to the one or more users determined from the obtained context data.

10. The computer program product of claim 8, wherein to provide access to the first and second tagged messages comprises the processing device to filter search results for the first and second tagged messages for the one or more users determined from the obtained context data.

11. The computer program product of claim 8, wherein the context data comprises at least one of an access control list, an identity of a user, a location of where the first or second tagged message is provided, a time when the first or second tagged message is provided, and a program used to provide the first or second tagged message.

12. The computer program product of claim 8, wherein to obtain the context data comprises the processing device to provide an option for a user to input context data for the first tagged message.

13. The computer program product of claim 12, wherein to obtain the context data comprises the processing device to obtain the context data based on user input.

14. The computer program product of claim 8, wherein to obtain the context data comprises the processing device to obtain the context data based on server data for the first tagged message.

15. A device comprising: at least one processor circuit configured to:
   receive a tagged message, wherein the tagged message is provided by a user at a geographic location and includes content;
   obtain context data associated with the tagged message, wherein the context data is provided based on at least one of user input for the tagged message or server data for the tagged message;
   receive another tagged message within a predetermined amount of time from receiving the tagged message, wherein the other tagged message is provided at the geographic location and includes other content;
   associate the obtained context data with the other tagged message based on the other tagged message being provided at the geographic location and being received within the predetermined amount of time from receiving the tagged message; and
   control access to the tagged message and the other tagged message to one or more users, wherein the one or more users are determined from the obtained context data.

16. The device of claim 15, wherein the at least one processor circuit is further configured to filter search results for the tagged message according to the obtained context data.

17. The device of claim 15, wherein the context data comprises at least one of an access control list, an identity of the user, the geographic location of where the tagged message is provided, a time when the tagged message is provided, and a program used to provide the tagged message.

18. The device of claim 15, wherein the at least one processor circuit is further configured to:
   identify an additional tagged message, wherein the additional tagged message includes additional content and is associated with additional context data;
   compare the context data associated with the tagged message with the additional context data associated with the additional tagged message; and
   group the content and the additional content based on comparing of the context data associated with the tagged message with the additional context data associated with the additional tagged message.

19. The device of claim 15, wherein the other tagged message is provided by the user at the geographic location.

20. The device of claim 15, wherein the other tagged message is provided by another user at the geographic location.

\* \* \* \* \*